(12) United States Patent
Celeskey et al.

(10) Patent No.: US 8,195,983 B2
(45) Date of Patent: Jun. 5, 2012

(54) METHOD AND SYSTEM FOR EVALUATING SOFTWARE QUALITY

(75) Inventors: Emily K. Celeskey, Johnson City, NY (US); Timothy D. Greer, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 12/255,753

(22) Filed: Oct. 22, 2008

(65) Prior Publication Data

US 2010/0100871 A1   Apr. 22, 2010

(51) Int. Cl.
*G06F 11/00* (2006.01)
(52) U.S. Cl. .......................... 714/38.1; 714/37
(58) Field of Classification Search .................. 714/37.1
See application file for complete search history.

(56) References Cited

U.S. PATENT DOCUMENTS

| | | | |
|---|---|---|---|
| 6,957,366 B1 * | 10/2005 | McDonald | 714/38.14 |
| 6,966,013 B2 * | 11/2005 | Blum et al. | 714/38.1 |
| 7,844,955 B2 * | 11/2010 | Tateishi et al. | 717/131 |
| 2004/0153835 A1 | 8/2004 | Song et al. | |
| 2004/0205722 A1 | 10/2004 | Shimada | |
| 2005/0015683 A1 | 1/2005 | Clark et al. | |
| 2005/0044451 A1 | 2/2005 | Fry et al. | |
| 2005/0081103 A1 * | 4/2005 | Kadkade | 714/37 |
| 2005/0216486 A1 | 9/2005 | Barshefsky et al. | |
| 2005/0246207 A1 * | 11/2005 | Noonan et al. | 705/4 |
| 2005/0262399 A1 * | 11/2005 | Brown et al. | 714/38 |
| 2006/0036635 A1 | 2/2006 | Williams | |
| 2006/0085132 A1 | 4/2006 | Sharma et al. | |
| 2006/0161508 A1 * | 7/2006 | Duffie et al. | 706/55 |
| 2006/0168565 A1 * | 7/2006 | Gamma et al. | 717/122 |
| 2007/0226546 A1 * | 9/2007 | Asthana et al. | 714/47 |
| 2008/0215921 A1 * | 9/2008 | Branca et al. | 714/38 |

* cited by examiner

*Primary Examiner* — Robert Beausoliel, Jr.
*Assistant Examiner* — Neil Miles
(74) *Attorney, Agent, or Firm* — Dennis Jung; Roberts Mlotkowski Safran & Cole, P.C.

(57) ABSTRACT

A method for evaluating software quality, the method including the steps of receiving test data for a system under test from a plurality of data sources and determining a failure category for at least one identified failure based on the test data from the plurality of data sources. Additionally, the method includes the steps of assigning a first error reputation to the system under test and assigning a second error reputation for each test file. Furthermore, the method includes the steps of generating at least one report indicating the failure category for the at least one identified failure.

22 Claims, 3 Drawing Sheets

METHOD AND SYSTEM FOR EVALUATING SOFTWARE QUALITY

FIELD OF THE INVENTION

The present invention generally relates to evaluating software quality, and more particularly, to an automated method and system for evaluating software quality.

BACKGROUND

Software testing is an empirical investigation conducted to provide stakeholders with information about the quality of the product or service under test, with respect to the context in which it is intended to operate. This software testing may include the process of executing a program or application with the intent of finding software bugs.

Testing, though, can never completely establish the correctness of computer software. Instead, it furnishes a criticism or comparison that compares the state and behavior of the product against oracles (e.g., principles or mechanisms by which someone might recognize a problem). These oracles may include, for example, specifications, comparable products, past versions of the same product, inferences about intended or expected purpose, user or customer expectations, relevant standards, applicable laws, or other criteria.

A purpose for testing is to evaluate software quality so that, for example, defects may be detected and corrected. The scope of software testing often includes examination of code as well as execution of that code in various environments and conditions, as well as examining the quality aspects of code. For example, quality aspects include an analysis of whether the code does what it is supposed to do and does perform its intended function. Information derived from software testing may be used to correct the process by which software is developed.

Automated testing may be carried out on a multi-threaded or hypervisor system. In computing, a hypervisor (or virtual machine monitor) is a virtualization platform that allows multiple operating systems to run on a host computer at the same time. For example, a hypervisor may be running several guest machines. Thus, this arrangement may involve a complicated test setup. However, conventional approaches do not have an ability to distinguish between different kinds of testing failures or determine the severity and impact of automated test case failures in a multi-threaded or hypervisor system environment.

Accordingly, there exists a need in the art to overcome the deficiencies and limitations described hereinabove.

SUMMARY

In a first aspect of the invention, a method for evaluating software quality comprises the steps of receiving test data for a system under test from a plurality of data sources and determining a failure category for at least one identified failure based on the test data from the plurality of data sources. Additionally, the method comprises assigning a first error reputation to the system under test based on the test data and assigning a second error reputation for each test file based on the test data. Furthermore, the method comprises generating at least one report indicating the failure category for the at least one identified failure.

In another aspect of the invention, a software quality evaluation system for evaluating software quality comprises first program instructions to receive test data for a system under test from a plurality of data sources and second program instructions to determine a failure category for at least one identified failure based on the test data from the plurality of data sources. Additionally, the software quality evaluation system comprises third program instructions to assign a first error reputation to the system under test based on the test data and fourth program instructions to assign a second error reputation for each test file based on the test data. Furthermore, the software quality evaluation system comprises fifth program instructions to generate at least one report indicating the failure category for the at least one identified failure. Additionally, the software quality evaluation system for evaluating software quality comprises a computer readable media which stores the first, second, third, fourth and fifth program instructions and a central processing unit to execute the first, second, third, fourth and fifth program instructions.

In an additional aspect of the invention, a computer program product comprising a computer usable storage medium having readable program code embodied in the medium is provided. The computer program product includes at least one component operable to receive test data for a system under test from a plurality of data sources and determine a failure category for at least one identified failure based on the test data from the plurality of data sources. The failure category is at least one of: a systemic error; a local error; a tester-caused error; and a conflict error. Additionally, the at least one component is operable to assign a first error reputation to the system under test and assign a second error reputation for each test file. Furthermore, the at least one component is operable to generate at least one report indicating the failure category for the at least one identified failure.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
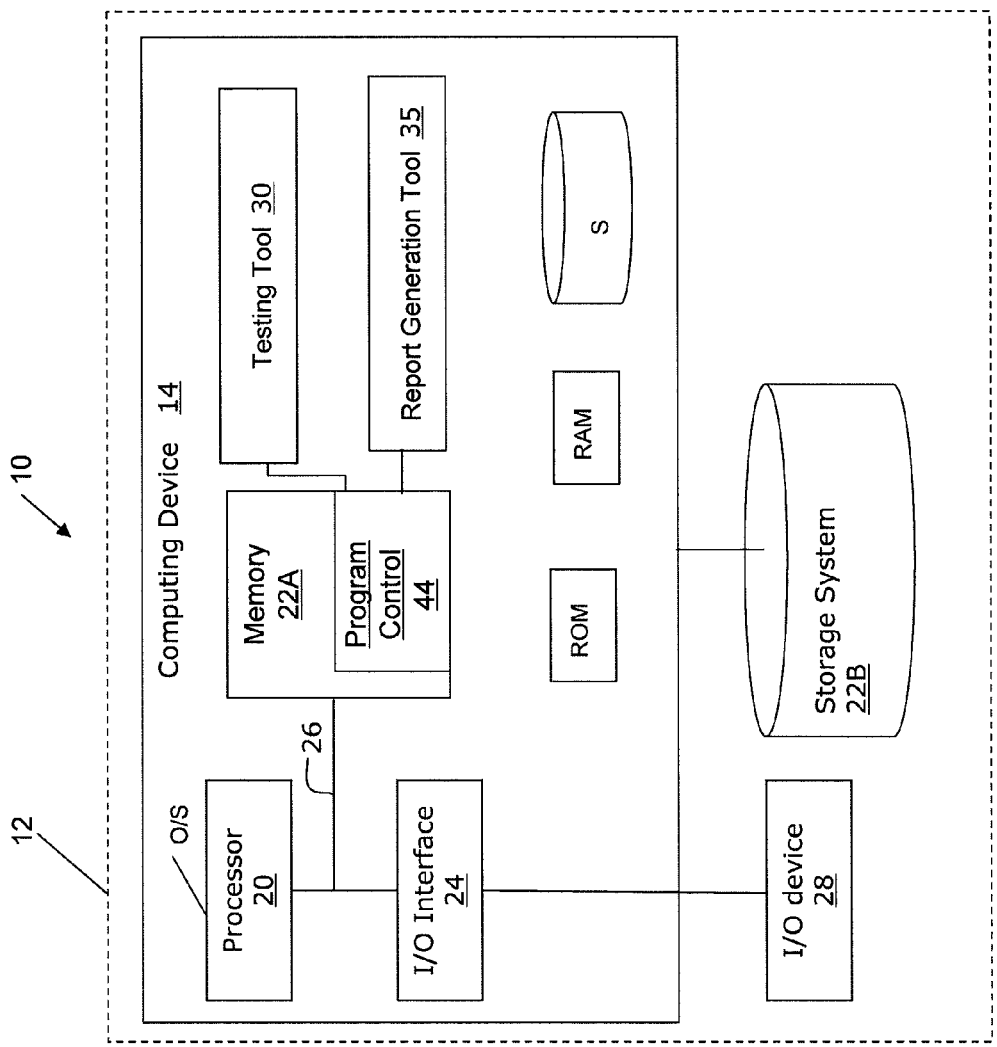
FIG. 1 shows an illustrative environment for implementing the steps in accordance with the invention.

The present invention generally relates to evaluating software quality, and more particularly, to an automated method and system for evaluating software quality. More specifically, the present invention includes an automated method and system for evaluating software quality, which utilizes logic, e.g., fuzzy logic, to combine data from a variety of sources to determine into which category or type an identified failure falls. In embodiments, types of failures may include:

1) a systemic failure, e.g., where the entire system under test is slowed or stopped;
2) a local failure, e.g., where one test case, thread or virtual machine (VM) fails;
3) a tester-caused error, e.g., where the failure does not reflect a defect, but instead a tester's inexperience; and
4) a conflict error, e.g., where the test case fails because of resource conflicts with the other tests running on the system under test, amongst other types of failures.

Additionally, the present invention determines a systemic error reputation for the system under test (either "high," indicating a higher likelihood for failure, or "low," indicating a lower likelihood of failure) and a local error reputation for each test file (which, likewise, is either "high" or "low").

Moreover, the present invention includes a presentation of the data to the relevant audiences (e.g., system administrators, individual testers and/or managers, amongst other relevant audiences).

By implementing the present invention, it is possible to determine the severity and impact of automated test case failures on a multi-threaded or hypervisor system, as well as systemic and local error reputations. Additionally, by implementing the present invention, different types of failures (e.g., a systemic failure, a local failure, a tester-caused failure and a conflict failure) may be identified. Additionally, implementing the present invention allows different end users (e.g., system administrators, individual testers and/or managers, amongst other end users) to be informed of the failures detected by the software testing. Depending on the end user viewing the results, different types of failures may be important. For example, system administrators may only be concerned with systemic or conflict failures. In contrast, individual testers may only be concerned with local or tester-caused failures in their test cases. Furthermore, for example, managers may want to be informed of all tester-caused failures as a way to evaluate employee effectiveness.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a testing tool 30 and a report generation tool 35. The testing tool 30 is operable to receive testing results, determine error types and determine a systemic error reputation and one or more local error reputations. The report generation tool 35 is operable to generate reports. The testing tool 30 and/or the report generation tool 35 can be implemented as one or more program code(s) in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes a storage (S), random access memory (RAM), a read-only memory (ROM), and an appropriate operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 having program code controls the testing tool 30 and the report generation tool 35. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Aspects of the Testing Tool

In embodiments, a testing environment set up may include one or more systems under test each running multiple threads or virtual machines which in turn are running test cases. This arrangement allows for the running test cases in parallel or in sequence. Moreover, in embodiments, this testing environment may run the tests on a regular basis and store the results in a storage device (e.g., storage system 22B of FIG. 1) so, for example, a historical comparison of the results is possible.

The method and system of the present invention presupposes that the test cases are running over a period of time, with, for example, some test cases running in parallel and some in sequence on different virtual machines or threads (hereinafter referred to as guests) on top of a hypervisor or in a multi-threaded environment (hereinafter referred to as a system under test). Several different systems under test may also run simultaneously and the same test cases may run on several different systems under test. It is also assumed that, in embodiments, the test cases run on a regular basis, such as, for example, daily. Additionally, in embodiments, the test cases may run in hierarchical fashion with test cases running in groups (hereinafter referred to as test files) and similar test files running sequentially on the same guest in groups (hereinafter referred to as buckets).

In accordance with the present invention, the testing tool 30 receives an indication of the errors—the errors likely caused by changes or updates to the code base—at the end of a regression run. As described above, these errors may include four types: 1) a systemic error, e.g., an error which slows down or stops the entire system under test; 2) a local error, e.g., an error which only affects a specific guest, thread, or test case; 3) a tester-caused error, e.g., an error which does not reflect a hardware or software defect but instead reflects a tester's inexperience (e.g., a badly written test case); and 4) a conflict error, e.g., an error which represents a failure caused when two or more specific test cases vie for system resources at the same time.

In the case of systemic failure, a system under test may have already suffered an unrecoverable error and so all test cases may fail. However, in accordance with aspects of the invention, all of these test failures would then not be considered as individual failures, but rather only as part of the systemic failure. In the case of tester-caused errors and local errors, the failure may be considered to present as one failure or a group of failures in the same test file or bucket.

In accordance with aspects of the invention, the testing tool 30 may use fuzzy logic to combine data from multiple sources to assign a local error reputation (e.g., "high" (indicating a small problem in the code under test) or "low" (indicating no small problem in the code under test)) to any particular test file as well a systemic error reputation to the system under test. That is, the assigned error reputation may be a "high" reputation for failure (which indicates a high likelihood of failure) or may be a "low" reputation for failure (which indicates a low likelihood of failure).

In embodiments, each failing test file may have a high local error reputation. Additionally, each failing test file may be considered as part of a systemic failure, and thus, may impact the systemic error reputation.

If the testing tool 30 determines that the individual failing test file has a high local error reputation, then the failing test file will be displayed to the tester. If the testing tool 30 detects that the system has an systemic error reputation past a certain threshold, this systemic error reputation information will be displayed to the system administrator. If the system detects an error for a test file in a system under test that does not have a high systemic error reputation and the test file itself does not have a high local error reputation, the testing tool 30 may determine the error to be a tester-caused error or a conflict error and may display the error to, e.g., the tester and a manager, as discussed further below.

Error Determination Data Sources

In accordance with aspects of the invention, the testing tool 30 may utilize a number of data sources to determine the type of error for a failing test file and/or system under test. These data sources may include: (1) the system under test information; (2) the failing test file itself; (3) errors flagged by the test case driver program; (4) past performance of the test file; (5) average ratio of failures to passes across the whole system; (6) average time of failing test files; (7) changes integrated into the code base (for the system or guest) since the last run; and (8) certain buckets or test files flagged by, e.g., the system administrator as being critical, amongst other data sources.

System Under Test

In accordance with aspects of the present invention, initially, the testing tool 30 receives the overall system under test information including, for example, an initial program load (IPL) date and a generated date. The IPL date indicates the last time the code was refreshed and the generated date indicate when the code level was actually generated from code base. The testing tool 30 may utilize the IPL date and generated dates to detect, e.g., server system problems. For example, if no test file results are received, the testing tool 30 may use the IPL date to confirm that the correct code is actually running. Moreover, the testing tool 30 may use the generated date to ensure that an analysis is not running on old code. That is, the testing tool 30 may review the overall system under test information to determine that the systems are, for example, displaying the correct code release.

Failing Test File

In embodiments, the data sources may include the failing test file itself, for example, the number of failing test cases and their pattern. That is, the testing tool 30 may determine where failures occur within a test file itself. Using this data source, the testing tool 30 may determine that the error is one of a systemic error or a local error. Additionally, using this data source, the testing tool 30 may determine a systemic error reputation (as "high" or "low") and a local error reputation (as "high" or "low").

More specifically, for example, if all the test cases in the file failed or a large number of test cases in the file failed, the testing tool 30 may determine that the failures are due to a systemic error. Moreover, if the testing tool 30 determines that the test case's failures were grouped, the error is more likely to be the same one error as opposed to many errors. For example, a highly-grouped test file, with, e.g., five to seven errors may contribute to a high systemic error reputation, while the test file itself may have a fairly low local error reputation. In contrast, a test file with very sparse failures (e.g., one or two groups of failures) may be identified as having a local error, and thus may have a high local error reputation, but the error in the test file may not affect the systemic error reputation.

In embodiments, as described in the exemplary failure analysis further below, in order to determine the contribution of the failing test files to the systemic error reputation, the testing tool 30 counts the test failures. Additionally, the testing tool 30 determines a weighted count of failures, as well as a weighted pass percentage, which can be compared to a threshold. The weighted pass percentage is an adjusted straight pass percentage (passes/(passes+fails)), which is weighted, as described further below, to more accurately assess the software quality. In embodiments, the weightings for the count of failures and for the pass percentage may vary. For example, the weightings may vary based on previous testing (e.g., over recent days).

Test Case Driver Program

In accordance with further aspects of the invention, the data sources may include errors flagged by a test case driver program. A test case driver program provides an expected output, issues controls and checks results against the expected output. Moreover, the test case driver program may issue a flag when an error is identified. Using this data source, the testing tool 30 may determine that the error is one of a systemic error or a tester-caused error. The test case driver program issues special messages when it is not being invoked properly. A test file with these messages may imply that a systemic failure has taken place or that the test case has a flaw in it due to a tester-caused error.

For example, if the test case driver program identifies errors all over the system under test, the identified failure is likely a systemic error. In this case, the testing tool 30 may determine the systemic error reputation to be high, while the local error reputation would stay low. Moreover, as the identified failure is likely a systemic error, the testing tool 30 would not flag the identified failure as a tester-caused error.

In contrast, if the test case driver program identifies, for example, one or two failing files, the testing tool 30 may not affect the systemic error reputation, but may indicate that the error is likely due to a tester-caused failure. In this case, as explained further below, the local failure error reputation for the failing test files may be high, while the systemic error reputation would stay low. Moreover, as explained further below, the error would be identified as potentially due to a tester-caused failure.

Test File Past Performance

In accordance with further aspects of the invention, the data sources may include the past performance of the test file and its associated test bucket. Using this data source, the testing tool 30 may determine that a failure is due to a tester-caused error or not due to a tester-caused error. Additionally, with this data source, the testing tool 30 may determine that the failure is due to a local error or a systemic error.

For example, if the same test file or test files in a bucket have found errors in the code base during past regression runs, the test file or test files are likely to find those errors in the code base again. A situation in which a test file always finds a failure in a code base may occur, for example, because the code base is not getting attention to fix the error in the code base. An error in the code base may not get attention, for example, due to a lack of resources to fix the code or because the bug causing the failure in the code base is deemed relatively unimportant. If the testing tool 30 finds these "old" or preexisting errors, the testing tool 30 may determine that the error is likely due to a tester-caused error. Moreover, as these are "old" or preexisting errors, as explained further below, these errors would not contribute much to the testing tool's determination of the systemic error reputation or the local error reputation of the test file.

However, if the error has never been found before or is seldom found, the error is likely due to a local error. For example, one two-run-old test case failure may be taken as a more serious error if the test file seldom had errors before. The fact that the error has occurred twice indicates that the problem is re-creatable. Since the file has had few failures before and the failure is the only one in the file, the testing tool 30 may determine the failure is likely due to a local error (e.g., an small error in the code under test). Accordingly, the testing tool 30 would not affect the systemic error reputation much or at all, but would indicate a high local error reputation of the test file.

Average Ratio of Failures

In accordance with further aspects of the invention, the data sources may include the average ratio of failures across the whole system under test, taken in historical context. Using this data source, the testing tool 30 may determine that the error is a systemic error or not a systemic error. More specifically, the testing tool 30 has access to a historical ratio of failures to passes, which may be stored in a database, e.g., storage system 22B of FIG. 1. Thus, the testing tool 30 has a general idea of an expected failure/pass ratio. If, at a given time, the testing tool 30 determines a fail/pass ratio that exceeds a standard deviation threshold (e.g., two standard deviations) compared to the historical fail/pass ratio, then the testing tool 30 may indicate a systemic error.

Average Time of Failing Test Files

In accordance with further aspects of the invention, the data sources may include the average time of failing test files, taken in historical context. Using this data source, the testing tool 30 may determine that the error is a systemic error, a conflict error or a local error. For example, test cases may be run overnight with the tests starting at the same time and ending at approximately the same time. Thus, test cases that always fail tend to run (and fail) at the same time night after night. As explained above, a situation in which a test file always finds a failure in a code base may occur, for example, because the code base is not getting attention to fix the error in the code base. An error in the code base may not get attention, for example, due to a lack of resources to fix the code or because the bug causing the failure in the code base is deemed relatively unimportant.

In accordance with aspects of the invention, the system under test will develop, over time, a pattern of failing test cases (which may be stored in a database, e.g., storage system 22B of FIG. 1). Moreover, the testing tool 30 may compare the failing time of a particular test case with its historical average failing time. If the testing tool 30 determines that a failing time of the particular failing test case is over a threshold of standard deviations (e.g., three standard deviations) from the historical average failing time, i.e., the failure is not occurring when expected, this determination may contribute to the testing tool 30 determining a high systemic error reputation, as explained further below. In contrast, if the testing tool 30 determines that a failing time of the particular failing test case is within a threshold of standard deviations from the historical average failing time, then this factor will not contribute to the testing tool's determination of the systemic error reputation, as the error is occurring when expected.

However, it should be understood that, in situations, this failure may also be due to a conflict error, e.g., where the test case fails because of resource conflicts with the other tests running on the system. Thus, according to aspects of the invention, the testing tool may calculate a standard deviation for all the start and end times for all the test files on the system under test. The testing tool 30 also calculates a standard deviation for all of the test files on the system containing failures. If the testing tool 30 determines that the standard deviation for the failing files' start and end times is less than two-thirds of the standard deviation of the start and end times for all the test files on the system under test, then the testing tool 30 determines that the failures are closely grouped failures. Thus, the testing tool 30 will identify these failures as possible conflict errors. Thus, as discussed further below, the reports generation tool 35 would include this error identified as a potential conflict error in a generated report, e.g., for system administrators.

Additionally, in embodiments, a clustering methodology may be applied to the failure information to better estimate which errors should be considered stand-alone, local errors (recognized as outliers by the methodology) and which are part of a systemic error. For example, a number of clusters well below the normal would result in the testing tool 30 increasing the systemic error reputation, as discussed further below.

Changes to Code Base Using Keywords

In accordance with further aspects of the invention, the data sources may include the changes integrated into the code base (for the system under test or guest) since the last run. Using this data source, the testing tool 30 may determine that the error is a local error, and thus indicate a high local error reputation for a failing test file. However, the testing tool 30 may identify the error as a tester-caused error (and thus, the report generation tool 35 may include this error identified as a potential tester-caused error in a tester report). Additionally, in embodiments, this data source may also be used to identify a systemic error.

For example, every day developers may add new code to the code base. The new code has associated keywords. These keywords may include, for example, release, version and/or load, amongst other keywords. The testing tool 30 may extract keywords from failing test cases. If the testing tool 30 determines a correlation between the keywords used in the update of the new code and the keywords in the failing test file, then the failure is highly likely to be a local error, e.g., a code error, requiring a legitimate fix for the code under test. Accordingly, the testing tool 30 would determine a high local error reputation for the code under test, but this error would not contribute the systemic error reputation determination.

Critical Test Files and/or Buckets

In accordance with further aspects of the invention, certain buckets or test files may be flagged by, e.g., the system administrator as being critical. With this scenario, the testing tool 30 may determine that the error is a systemic error or not a systemic error. That is, if a failure occurs in a flagged test file, the testing tool 30 will determine a high systemic error reputation for the system under test. Moreover, in embodiments, these critical test files and buckets will not have individual local error reputations.

Report Generation Tool

In accordance with further aspects of the invention, the report generation tool 35 may generate summary reports (e.g., various HTML pages). The report generation tool 35 builds one or more summary reports, e.g., an HTML file, for testers that highlights individual test files that have a worse performance than they had in the previous week (e.g., those test files with newly failing test cases). Moreover, for any system under test which the test failed on, the report generation tool 35 lists the failing test files and the reasons for failure.

In embodiments, the generated reports may include a report for the system administrator and a report for the testers, amongst other reports. Depending on the end user looking at the results, different types of failures may be important. For example, system administrators may be interested in systemic or conflict failures, whereas individual testers may only want to be informed about local or tester-caused failures in their test cases. Additionally, managers may want to see all tester-caused failures as a way to evaluate employee effectiveness. Thus, in embodiments, the report for the system administrator should indicate which systems were likely to have suffered systemic failures and which of the above reasons contributed to the high systemic reputation. Additionally, in embodiments, the report for the testers should indicate which test files had high local error reputations and the reasons for the high local error reputation. Also, the report for testers should show other test files which had failures at the same time as the test cases having high local error reputations to help identify cases of conflict errors.

Furthermore, in embodiments, the testing tool 30 may maintain a log of which test files had low local error reputation due to poor past performance, for example, in a database, e.g., the storage system 22B of FIG. 1. In embodiments, this information may not be displayed on a report, but may be stored in, e.g., log format for reference.

Exemplary Failure Analysis

With this exemplary failure analysis, the testing tool 30 analyzes three kinds of files: system information, bucket information and test file information. System information comprises a list of links to buckets and test files. (However, it should be understood that, in embodiments, not all test files are necessarily grouped within a bucket.) Bucket information generally contains several test files, which are all related and run sequentially on a single guest on the system. Test file information may contain many test cases, which are all related and run sequentially.

System Under Test Information

In accordance with aspects of the present invention, initially, the testing tool 30 receives the overall system under test information including, for example, an initial program load (IPL) date and a generated date. The IPL date indicates the last time the code was refreshed and the generated date indicate when the code level was actually generated from code base. The testing tool 30 may utilize the IPL date and generated dates to detect, e.g., server system problems. For example, if no test file results are received, the testing tool 30 may use the IPL date to confirm that the correct code is actually running. Moreover, the testing tool 30 may use the generated date to ensure that an analysis is not running on old code. That is, the testing tool 30 may review the overall system under test information to determine that the systems under test are, for example, running the intended code release.

Test File Information

The testing tool 30 extracts the number of passing/failing test cases in each test file, the start and finish time of each test file and identifies which test cases failed, utilizing the failing test files, described above, as a data source. Additionally, the testing tool 30 determines if there are warnings of test case driver program errors, utilizing the test case driver program failures, described above, as a data source. Furthermore, the testing tool 30 outputs one file per system, and generates one line for each test file. For example, the testing tool 30 may generate a line for a test file stating:

:nick.WEECHUG :name.RELSPEC :pass.18 :fail.10 :stime.76740 :sdate.733288
:etime.77357 :edate.733288 :warning.1 :failures.*4*12*16*17*18*19*21*23*27*28, where "nick" is the bucket name, "name" is the test file name, "pass" is the number of test cases which passed within this test file, "fail" is the number of test cases which failed within this test file, "stime" and "sdate" represent the starting time and date of the test file, e.g., in seconds past midnight, "etime" and "edate" represent the ending time and date of the test file, e.g., in restructured extended executor (REXX) binary date format, "warning" specifies if there were any test driver program errors (with this example there was a test driver program error, as represented by the 1) and "failures" indicates which test cases of the test file failed. Thus, with this particular test file, there were ten test case failures.

While only one generated line indicating the results of a test file is shown above, it should be understood that the testing tool 30 will generate a line for each test file. Thus, for example, for a given system, the testing tool 30 may generate, e.g., hundreds of lines (one for each test file). In embodiments, the number of test case failures for each test file is utilized by the testing tool 30 to determine a systemic error reputation for the system under test and to determine a local error reputation for particular test files, as explained further below.

Determining Local Error Reputation

Next, the testing tool 30 compares the previous nights' results to historical results, e.g., the results of the previous week, to utilize the test file past performance data source, described above. That is, the test file past performance data source may be used to identify new failures. If a new failure in a test file is detected, the testing tool 30 will indicate a high local error reputation for the test file. Except, if a new failure in a newly run test file is detected, the error may likely be due to a tester-caused error. Thus, according to further aspects of the invention, this identified error is identified as a potential tester-caused error in the tester report generated by the report generation tool 35, as described above. Moreover, as discussed further below, the new failure may also impact the systemic failure reputation determination.

For each test file, the testing tool 30 will generate an entry indicating whether the test file had any new failures, as compared to the historical results. For example, the generated entry for the above test file may be:

:nick.GDLGCT1 :buck.WEECHUG :name.RELSPEC :newfail.none, where "nick" is the system name, "buck" is the bucket name, "name" is the test file name and "newfail" quantifies any test cases within this test file that failed for the first time the previous night. With the above example, RELSPEC has been failing for awhile. However, as can be observed, with this example, the testing tool 30 has not identified any new failing test cases. Thus, with this example, as there are no new failures, the testing tool 30 will not indicate a high local error reputation for this test file. Again, it should be understood that, while only a single entry indicating a number of new fails is shown, the testing tool 30 will generate an entry indicating new failures for each test file.

Determining Systemic Error Reputation

Additionally, in order to determine the systemic error reputation, the testing tool 30 calculates the straight pass/fail percentages (or pass/(pass+fail)) for each test file, bucket and the system using the average rate of failure data source, as described above. Moreover, the testing tool 30 generates an entry for straight pass/fail percentages for files, buckets and the system under test. More specifically, the testing tool 30 generates an entry for straight pass/fail percentages for each bucket considering test files and test cases, for the system under test considering test files, test cases and buckets, and the overall system (i.e., all the systems under test) considering test cases, test files and buckets.

Thus, for example, the generated entry for the above bucket, considering test cases is:

:nick.GDLGCT1 :buck.WEECHUG :name.results :passed.32 :failed.10 :percent.76.19, where "nick" is the system name, "buck" is the bucket name, the "name" indicates that this is the results of all the test cases in the bucket and "percent" is a passing percentage determined by calculating passed/(passed+failed). Thus, with this example, the straight pass/fail percentage for all the test cases in the bucket is (32/(32+10))=76.19. While only a single generated entry is shown, it should be understood that the testing tool 30 generates an entry for results of all the test cases in a bucket, for each bucket in the system under test.

Furthermore, the generated entry for the bucket, considering test files is:

:nick.GDLGCT1 :buck.WEECHUG :name.results2 :passed.8 :failed.1 :percent.88.89, where "nick" is the system under test name, "buck" is the bucket name, the "name" indicates that this is the results of all the test files in the bucket and "percent" is a passing percentage determined by calculating passed/(passed+failed). Again, while only a single generated entry is shown, it should be understood that the testing tool 30 generates an entry for results of all the test files in a bucket, for each bucket in the system under test. As should be understood by those of skill in the art, and as can be observed, a test file may contain multiple test cases. As such, for the same bucket "WEECHUG," there are more test cases than test files.

Moreover, the testing tool 30 generates entries for the system under test considering test cases, test files and buckets. For example, the generated entry for the system under test, considering test cases is:

:nick.GDLGCT1 :buck.resultsres :passed.4608 :failed.51 :percent.98.91, where "nick" is the system under test name, "buck" indicates that this is the results of all the test cases in the system under test and "percent" is a passing percentage determined by calculating passed/(passed+failed). Additionally, the generated entry for the system under test, considering test files is:

:nick.GDLGCT1 :buck.resultsre2 :passed.272 :failed.19 :percent.93.47, where "nick" is the system under test name, "buck" indicates that this is the results of all the test files in the system under test and "percent" is a passing percentage determined by calculating passed/(passed+failed). Furthermore, the generated entry for the system under test, considering buckets is:

:nick.GDLGCT1 :buck.resultsre3 :passed.18 :failed.9 :percent.66.67, where "nick" is the system under test name, "buck" indicates that this is the results of all the buckets in the system under test and "percent" is a passing percentage determined by calculating passed/(passed+failed). Additionally, while only one generated entry is shown for the system under test for each of by test case, by test file and by bucket, if the overall system testing environment comprises multiple systems under test, the testing tool 30 generates an entry for each system under test by test case, test file and bucket.

The testing tool 30 also generates an entry for the overall testing environment (e.g., comprising multiple systems under test) by test case, test file and bucket. For example, the generated entry for all the systems under test by test case:

:nick.OVERALL :passed.15.03E+3 :failed.1667 :percent.90.0, where "nick" indicates that this is the results of all the systems under test in the testing environment by test case, and "percent" is a passing percentage determined by calculating passed/(passed+failed).

Additionally, the generated entry for all the systems under test by test file is:

:nick.OVERALL2 :passed.884 :failed.137 :percent.86.58, where "nick" indicates that this is the results of all the systems under test in the testing environment by test file, and "percent" is a passing percentage determined by calculating passed/(passed+failed).

The generated entry for all the systems under test by bucket is:

:nick.OVERALL3 :passed.63 :failed.46 :percent.57.80, where "nick" indicates that this is the results of all the systems under test in the testing environment by bucket, and "percent" is a passing percentage determined by calculating passed/(passed+failed).

In determining the systemic error reputation, the testing tool 30 utilizes the failing test files data source, described above, to calculate the average number of test case failures per test file over the entire system under test. With the above example, for system GDLGCT1, the average number of failures per file over the entire system is 2.82352941. That is, for the shown test file "RELSPEC" entry, the number of test case failures is ten. However, as explained above, for a given system under test, there may be, e.g., hundreds of test files. Thus, while all the test file entries are not shown above, with the given example, the testing tool 30 has determined the average number of test case failures per test file over the entire system under test to be 2.82352941.

The testing tool 30 determines if the number of test case failures for any particular test file is more than a threshold, e.g., three standard deviations, above the average number of test case failures per test file over the entire system under test (with this example 2.82352941). If the testing tool 30 identifies a test file as having more than the threshold, e.g., three standard deviations, then the testing tool 30 adds an entry to the test file information indicating how many standard deviations the number of failures in a particular test file is above the average number of test case failures per test file. According to aspects of the invention, using the standard deviation threshold (e.g., three standard deviations), may help to normalize the number of failures, such that, for example, one failing file will not make the entire systemic error reputation look bad (i.e., have a high systemic error reputation).

For example, a generated entry for the above test file may be:

nick.GDLGCT1 :buck.WEECHUG :name.RELSPEC :out.3.64659015, where "nick" is the system under test name, "buck" is the bucket name, "name" is the test file name and "out" indicates how many standard deviations above the average the number of failures in this particular file is. Thus, with this example, the test file "RELSPEC" had ten errors, which is above the three standard deviation threshold from the average number of test case failures per test file over the entire system (i.e., with this example 2.82352941). Thus, as can be observed, the testing tool 30 has determined that the test case errors for this test file (i.e., ten test case failures) is 3.64659015 standard deviations above the average number of test case failures per test file over the entire system (i.e., 2.82352941). As the number of standard deviations that this test file is above the average (i.e., 3.64659015) is greater that the standard deviation threshold, e.g., three standard deviations, the testing tool 30 has indicated this value in the generated entry for this test file. Again, while only a single generated entry is shown above, it should be understood by those of skill in the art that the testing tool 30 will generate an entry for each test file whose number of test case errors exceeds the standard deviation threshold.

In accordance with further aspects of the invention, in determining the systemic error reputation, the testing tool 30 calculates a weighted pass percentage for the system under test, using the following exemplary methodology. Initially, the above-determined test case failures for a test file are weighted. The testing tool 30 determines if this is the first night the test has been run. In embodiments, the testing tool 30 may utilize historical data to determine whether this is the first night the test has been run.

If the testing tool 30 determines that this is the first night the test has been run, then all of the test case failures for a particular test file are reduced to a constant number of test case failures (e.g., a value of one). That is, regardless of the number of test case failures of a test file, the testing tool 30 reduces the number of test case failures for that test file to the constant number, e.g., one. According to aspects of the invention, if this is a new test, then it is likely that the number of test case failures is not due to a systemic error, but rather, is likely due to a tester-caused error. Thus, in order to achieve a more accurate determination of a systemic error reputation, these multiple test case errors are "assumed" to be caused by a tester-caused error. Therefore, the testing tool 30 reduces these multiple test case errors to the constant number of errors, e.g., a single error, for the test file.

However, if the testing tool determines that this is not the first night the test has run, any new test case failures for a test file are weighted by a new-fail-on-old-test factor, e.g., a factor of two, and for any old test case failures, all of these old failures are reduced to the constant number of test case failures, e.g., a single test case failure (i.e., a value of one). That is, if the test has been running previously, and a new failure is detected, the error is likely a systemic error. Thus, testing tool 30 weights these new failures higher in determining a systemic error reputation.

Additionally, the new failures value (i.e., the failures values initially weighted as described above) are further weighted based on whether the level of code is old or new, whether there are warnings and whether there is an outlier value for the failures. For example, if the testing tool 30 determines that the level of code is old, then the testing tool 30 further weights new failures value by an old code factor, e.g., a factor of one half (i.e., failures=failures/2). In embodiments, the testing tool 30 may utilize the generated date to determine whether the code is old or new. For example, if the testing tool 30 determines if the generated date is within, e.g., one day of the present time, then the testing tool 30 identifies the code as new code. Otherwise, the testing tool 30 identifies the code as old code.

Additionally, if the testing tool 30 detects that there are warnings (i.e., a test case driver error warning), then the testing tool 30 further weights the new failures value by a warning factor, e.g., a factor of one half (i.e., failures=failures/2). Moreover, if the testing tool 30 detects that there is an outlier value for the failures, i.e., exceeding the standard deviation threshold, then the testing tool 30 further weights the new failures value by a factor of one/number of standard deviations above the average number of failures (e.g., with this example, 1/3.64659015).

In accordance with further aspects of the invention, the testing tool 30 divides both the number of passes and the number of failures by a hierarchy factor, e.g., a factor of two for each level down in the hierarchy of systems, buckets and test files. That is, the further down in the hierarchy a number of errors are located, the closer these errors may be related. Thus, in accordance with aspects of the invention, these errors should be weighted to count less than the actual number of individual errors. For example, if the testing tool 30 is testing a test file within a bucket, the testing tool 30 divides both the number of passes and the number of failures by two. Additionally, for example, if the testing tool 30 is testing a test file within a bucket within another bucket, the testing tool 30 divides both the number of passes and the number of failures by four.

Thus, with the test file of the above example, the testing tool 30 determines a number of failures for the RELSPEC test file as ten failures. However, with this example, this is not the first night the test has run and the failures are old failures. Thus, in accordance with aspects of the invention, the ten test case failures are reduced to a constant number, e.g., a single test case failure (i.e., the number of failures is reduced to one). Additionally, with this example, as the testing tool 30 detected warnings, the testing tool 30 adjusts the number of test case failures by the warning factor, e.g., a factor of one half (i.e., the number of failures is reduced from one to one-half). Furthermore, with this example, the testing tool 30 has determined that the failure is an outlier (i.e., exceeding the standard deviation threshold). Thus, in accordance with aspects of the invention, the testing tool 30 adjusts the failure rate by a factor of one/number of standard deviations above the average number of failures. Thus, with the above example, the testing tool 30 divides the failure rate of 0.5 by 3.64659015, resulting in a weighted failure rate of 0.13711.

In accordance with further aspects of the invention, in determining the systemic error reputation, the testing tool 30 sums the above-determined weighted failure rate for each of the test files of a particular bucket to the failure total for the bucket. Thus, with this example, since the test file RELSPEC is the only failing test file in the bucket WEECHUG, the total failure rate for the bucket WEECHUG remains 0.13711. That is, as can be observed in the above-shown generated entry for the bucket WEECHUG, considering test files, there is only a single identified failing test file. This can also be determined from the above-shown generated entry for the bucket WEE-CHUG, considering test cases, which indicates ten failing test cases. As the bucket WEECHUG (which includes the test file RELSPEC) contains total of ten test case failures and the test file RELSPEC contains ten test case failures, the testing tool 30 can determine that the ten test case failures of the bucket WEECHUG are the same ten test case failures of the test file RELSPEC.

Additionally, since with the above example the testing is in the WEECHUG bucket (i.e., one level down), the testing tool 30 divides the weighted failure rate by the hierarchy factor, e.g., two, resulting in a weighted failure rate of 0.06855. The testing tool 30 adds the weighted failure rate for each test file and bucket to the system total failure rate and divides the passes by the hierarchy factor, e.g., two. From all the buckets or individual test files on the system under test the testing tool 30 then determines the weighted percentage for the system under test by dividing the weighted passing tests by the total weighted tests (i.e., total weighted passing tests and the total weighted failed tests). Thus, with the above example, the testing tool 30 determines a weighted pass percentage for the system under test of 99.62%. As can be observed, with this example, the weighted passing percentage for the system under test is higher than the previously determined straight passing percentage for the system under test, shown above.

Additionally, in order to make a final determination of the systemic error reputation, the testing tool 30 builds a system-wide perspective which uses criteria to indicate whether the code on each system under test was good or bad (whether the test passed or failed). Thus, according to aspects of the invention, the testing tool 30 will assign a high systemic error reputation to the system under test if any of the criteria are not met. On the other hand, if the testing tool 30 determines that all of the criteria are met, then the testing tool 30 assigns a low systemic error reputation to the system under test.

In embodiments, the criteria includes: (1) the weighted percentage (which must be greater than a threshold, e.g., ninety-five percent); (2) whether the system under test suffered a failure resulting in a system outage or not; (3) whether two-thirds of the average number of test cases have completed; and (4) whether any of the critical test files and/or buckets failed. In embodiments, the testing tool 30 may determine whether the system under test suffered a failure resulting in a system outage or not by utilizing the IPL date and generated dates. Moreover, the third criteria, i.e., requiring two-thirds of the average number of test cases to have completed, ensures that the testing is sufficiently complete. For example, two-thirds of the average number of test cases may not have completed due to slow performance of the testing environment.

Determining Tester-Caused Errors

Furthermore, in embodiments, the testing tool 30 may utilize the keyword data source by matching the keywords in newly integrated code to the keywords in the failing test file/test case to identify a tester-caused error. That is, if testing reveals failures in newly integrated code, the testing tool 30 may match the failing test file or test case to the newly integrated code. To facilitate this matching, the code integration software includes keywords fields which may be easily extractable. Possible keywords for the RELSPEC file may be, for example: release, version, or load, all of which would turn up pertinent pieces of code integrated for them.

Additionally, as described above, the testing tool 30 may also identify potential tester-caused errors by identifying new errors or test driver program errors. That is, in embodiments, the testing tool 30 may not be able to identify a particular error as a tester-caused error with certainty; however, if the testing tool 30 identifies a potential tester-caused error, the report generation tool 35 will include this information in a generated report, e.g., the tester report and/or the manager report.

Determining Conflict Errors

The testing tool 30 may identify potential conflict errors, where a failure is due to resource conflicts with other tests running on the same system under test. In embodiments, the testing tool 30 performs a system-wide comparison of the failure times, using the standard deviations of the start and end times of the failing files and highlights any systems in which these standard deviations are less than ⅔rds of the standard deviations of the start and end times for all the files on the system, as having closely grouped failures (which could indicate a conflict error).

More specifically, the testing tool 30 may calculate a standard deviation for all the start and end times for all the test files on the system under test. The testing tool 30 also calculates a standard deviation for all of the test files on the system containing failures. If the testing tool 30 determines that the standard deviation for the failing files' start and end times is less than two-thirds of the standard deviation of the start and end times for all the test files on the system under test, then the testing tool 30 determines that the failures are closely grouped failures. Thus, the testing tool 30 will determine these failures as possible conflict errors. Thus, as discussed further below, the reports generation tool 35 would include this error identified as a potential conflict error in a generated report, e.g., for system administrators.

Determining Additional Systemic and Local Errors

According to further aspects of the invention, in embodiments, the testing tool 30 may record the best fail/pass ratio (i.e., the lowest fail/pass ratio) and the average fail/pass ratio. Moreover, the testing tool 30 may compare a current performance of the system with the best fail/pass ratio, and the report generation tool 35 may indicate the comparison. For example, the report generation tool 35 may indicate the current performance as worse than the best fail/pass ratio (e.g., with red), as the same as the best fail/pass ratio (e.g., with yellow), or better than the best fail/pass ratio (e.g., with green). Moreover, if the testing tool 30 detects a current performance as worse than the best fail/pass ratio (e.g., with red), the testing tool 30 may indicate that the test file or the bucket contains a local error or the system contains a systemic error.

According to further aspects of the invention, the testing tool 30 may utilize the average ratio of failures to passes data source, described above, to identify additional systemic and/or local errors. More specifically, the testing tool 30 may compare the straight passing percentages for the test cases, the test files and buckets to the historical fail/pass ratio. If the testing tool 30 determines that a straight fail/pass ratio exceeds a standard deviation threshold as compared to the average fail/pass ratio, then the testing tool 30 may indicate that the test file or the bucket contains a local error or the system contains a systemic error.

Flow Diagrams

Figure 2:
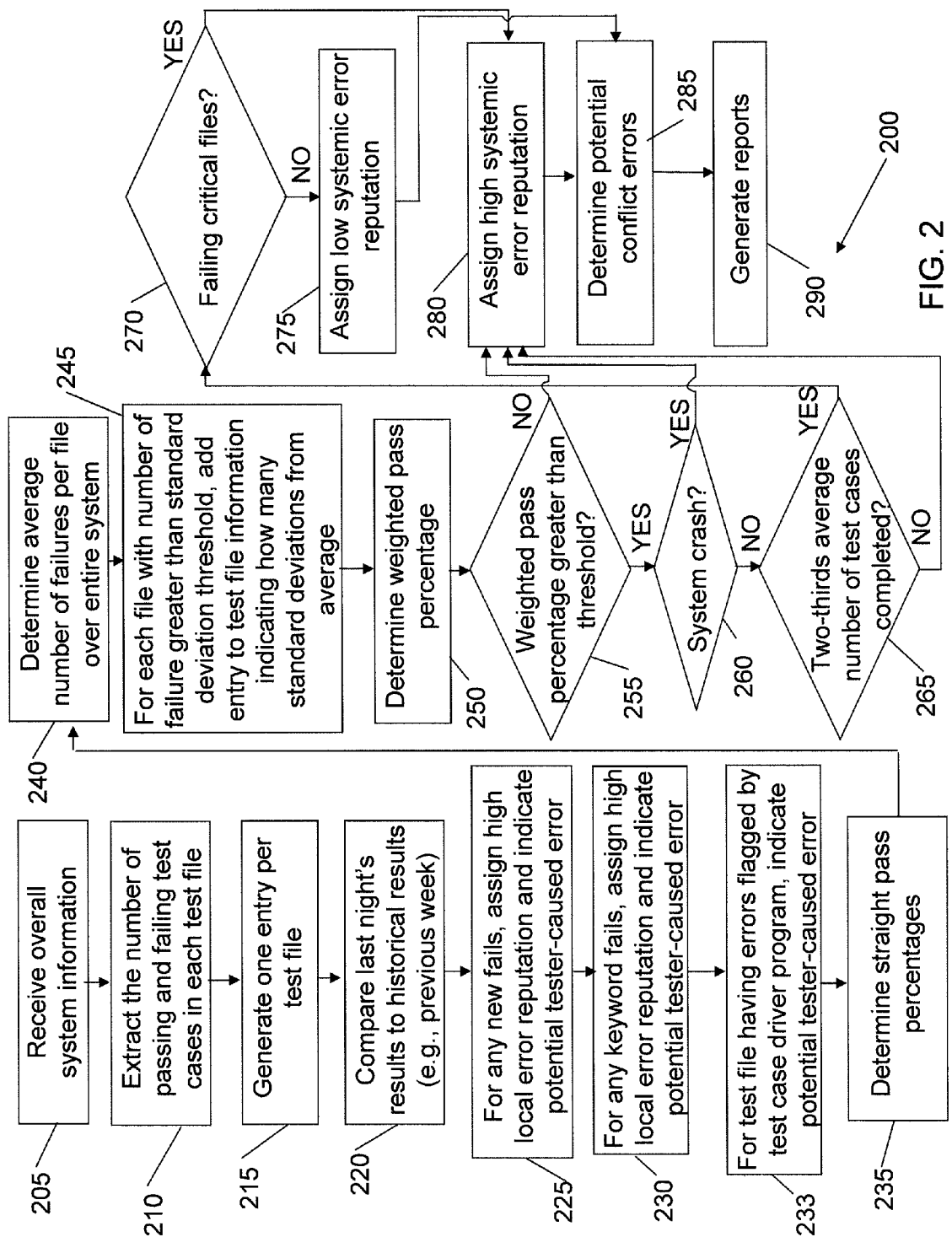
FIGS. 2 and 3 show exemplary flows for practicing aspects of the present invention.
Figure 3:
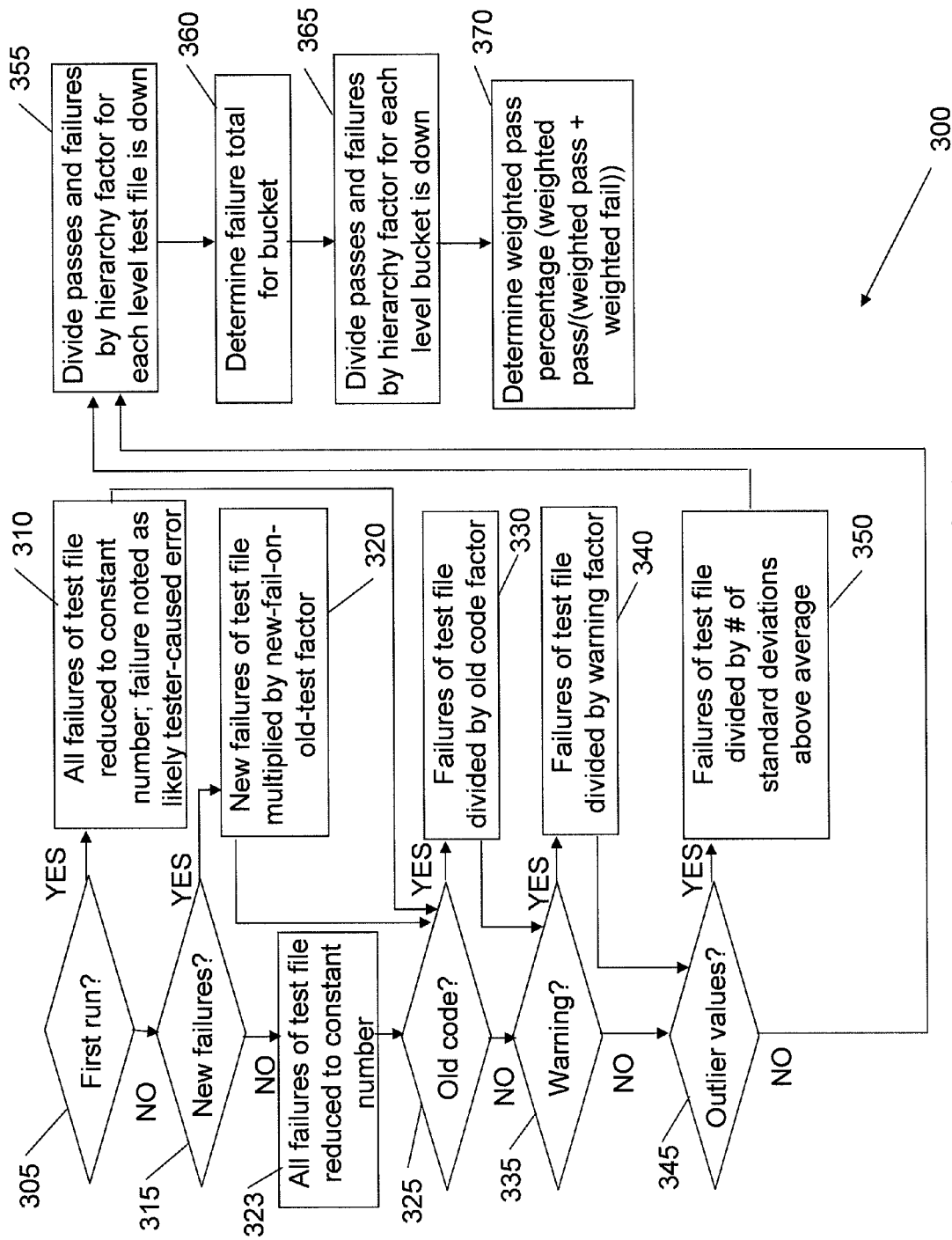

FIGS. 2 and 3 show exemplary flows for performing aspects of the present invention. The steps of FIGS. 2 and 3 may be implemented in the environment of FIG. 1, for example. The flow diagrams may equally represent a high-level block diagrams of the invention. The flowcharts and/or block diagrams in FIGS. 2 and 3 illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. Each block of the flowcharts, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 2 shows an exemplary flow diagram 200 for evaluating software quality in accordance with aspects of the invention. At step 205, the testing tool receives overall system under test information, including the IPL dates and the generated dates. At step 210, the testing tool extracts the number of passing and failing test cases in each test file. At step 215, the testing tool generates one entry for each test file. At step 220, the testing tool compares the test results, e.g., last night's test results, to historical results (e.g., the previous week). At step 225, for any new fails of test file, the testing tool assigns a high local error reputation to that test file and indicates that the test file has a potential tester-caused error. At step 230, the testing tool assigns a high local error reputation to that test file if the testing tool detects any keyword fails of a test file and indicates that the test file has a potential tester-caused error. At step 233, the testing tool indicates that the test file contains a potential tester-caused error for any test file having errors flagged by test case driver program.

At step 235, the testing tool determines the straight pass percentages for the test files, the buckets and the system. At step 240, the testing tool determines the average number of test case failures per test file over the entire system. At step 245, the testing tool determines each test file with a number of test case failures greater than a standard deviation threshold (e.g., three standard deviations from the average number of test case failures per test file over the entire system). Additionally, at step 245, the testing tool adds an entry to the test file information indicating how many standard deviations the number of test case failures is from the average number of test case failures per test file over the entire system under test. At step 250, the testing tool determines a weighted pass percentage for the system under test. The particulars of step 250 are set forth in more detail in exemplary flow 300, discussed below.

At step 255, the testing tool determines whether the weighted pass percentage is greater than a threshold (e.g., ninety-five percent). If, at step 255, the testing tool determines that the weighted pass percentage is not greater than the threshold, then at step 280, the testing tool assigns a high systemic error reputation to the system under test. If, at step 255, the testing tool determines that the weighted pass percentage is greater than the threshold, then the process proceeds to step 260. At step 260, the testing tool determines whether the system under test suffered a failure resulting in system outage during the testing. If, at step 260, the testing tool determines that the system under test suffered a failure resulting in system outage during the testing, then at step 280, the testing tool assigns a high systemic error reputation to the system under test. If, at step 260, the testing tool determines that the system under test did not suffer a failure resulting in system outage during the testing, then the process proceeds to step 265.

At step 265, the testing tool determines whether two-thirds of the average number of test cases have completed. If, at step 265, the testing tool determines that two-thirds of the average number of test cases have not completed, then at step 280, the testing tool assigns a high systemic error reputation to the system under test. If, at step 265, the testing tool determines that two-thirds of the average number of test cases have completed, then the process proceeds to step 270. At step 270, the testing tool determines whether any critical test files have failed. As described above, a user may identify some test files may as critical test files. Failure of these critical test files will be detected by the test case driver program, which allows the testing tool to determine whether any critical test files have failed. If, at step 270, the testing tool determines that any critical test files have failed, then at step 280, the testing tool assigns a high systemic error reputation to the system under test. If, at step 270, the testing tool determines that no critical test files have failed, then the process proceeds to step 275. At step 275, the testing tool assigns a low systemic error reputation to the system under test.

After either step 275 or step 280, the process proceeds to step 285. At step 285, the testing tool determines any potential conflict errors by performing a system-wide comparison of the failure times, using the standard deviations of the start and end times of the failing files and highlights any systems in which these standard deviations are less than ⅔rds of the standard deviations of the start and end times for all the files on the system, as having closely grouped failures (which indicates a potential conflict error). At step 290, the reports generation tool generates reports. For example, the reports generation tool may generate a report for the system administrator and a report for the testers, amongst other reports. The report for the system administrator should indicate which systems under test were likely to have suffered systemic failures and which of the above reasons contributed to the high systemic reputation. The report for the testers should indicate which test cases had high local error reputation and the reasons for the high local error reputation.

FIG. 3 shows an exemplary flow 300 for determining a weighted pass percentage for the system under test in accordance with aspects of the invention. At step 305, the testing tool determines whether the test is being run for the first time. If, at step 305, the testing tool determines that the test is being run for the first time, at step 310, the testing tool reduces all test case failures for each test file to a constant number of test case failures, e.g., one, tags the test case failures as a likely tester-caused error, and proceeds to step 325. If, at step 305, the testing tool determines that the test is not being run for the first time, then the process proceeds directly to step 315. At step 315, the testing tool determines whether there are any new test case failures. If, at step 315, the testing tool determines that there are new test case failures, at step 320, the testing tool multiplies the number of new test case failures by the new-fail-on-old-test factor, e.g., two, and proceeds to step 325. If, at step 315, the testing tool determines that there are no new test case failures, then the process proceeds directly to step 323. As step 323, the testing tool reduces all test case failures for each test file to the constant number of test case failures, e.g., one.

At step 325, the testing tool determines whether the test files are running on old code by determining that the generated date is not within one day of the present time. If, at step 325, the testing tool determines that a test file is running on old code, then at step 330, the testing tool divides the number of test case failures for that test file by old code factor, e.g., two, and proceeds to step 335. If, at step 325, the testing tool determines that a test file is not running on old code, then the process proceeds directly to step 335. At step 335, the testing tool determines whether there were any warnings (e.g., test case driver program errors) for the test files. If, at step 335, the testing tool determines that there were warnings for a test file, at step 340, the testing tool divides the number of test case failures for that test file by the warning factor, e.g., two, and proceeds to step 345. If, at step 335, the testing tool determines that there were no warnings for any test files, then the process proceeds directly to step 345.

At step 345, the testing tool determines whether there were any outlier values for any test file, i.e., exceeding the standard deviation threshold. If, at step 345, the testing tool determines that there were any outlier values for any test file, then at step 350, the testing tool divides the number of failing test cases for that test file by the number of standard deviations above the average number of failing test cases per test file, and proceeds to step 355. If, at step 345, the testing tool determines that there were not any outlier values for any test file, then the process proceeds directly to step 355. At step 355, the testing tool divides the number of passes and the adjusted number of failures by the hierarchy factor for each level a test file is down in the hierarchy. At step 360, the testing tool determines the failure total for each bucket by summing the adjusted number of failures for each test file in the bucket. At step 365, the testing tool divides the adjusted number of passes and the adjusted number of failures by the hierarchy factor for each level a bucket is down in the hierarchy to determine a weighted number of passes and a weighted number of failures. At step 370, the testing tool determines a weighted pass percentage, i.e., (weighted number of passes/ (weighted number of passes +weighted number of failures)). As explained above, the weighted pass percentage is used by the testing tool to determine a systemic error reputation for the system under test.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method for evaluating software quality, said method comprising the steps of:
   receiving test data for a system under test from a plurality of data sources;
   determining a failure category for at least one identified failure based on the test data from the plurality of data sources;
   assigning a first error reputation to the system under test based on the test data;
   assigning a second error reputation for each test file based on the test data; and
   generating at least one report indicating the failure category for the at least one identified failure,
   wherein the first error reputation is one of high and low; and
   the second error reputation is one of high and low.

2. The method of claim 1, wherein the plurality of data sources comprise at least one of:
   system under test information;
   a failing test file;
   a test case driver program;
   a test file past performance;
   an average ratio of failing test files to passing test files;
   an average time of failing test files;
   changes to test code using a keyword; and
   an identified critical test file or bucket.

3. The method of claim 1, wherein:
   the failure category comprises at least one of:
      a systemic error;
      a local error;
      a tester-caused error; and
      a conflict error.

4. The method of claim 1, wherein the at least one report comprises at least one of:
   a system administrator report indicating one or more systems under test having a high first error reputation and which of the plurality of data sources contributed to the high first error reputation;
   a tester report indicating one or more test files having a high second error reputation, which of the plurality of data sources contributed to the high second error reputation, and other test files which failed at a same time as the one or more test files having a high second error reputation to identify potential conflict errors; and
   a manager report indicating all tester-caused failures.

5. A method for evaluating software quality, said method comprising the steps of:
   receiving test data for a system under test from a plurality of data sources;
   extracting a number of test case failures for a particular test file;
   determining an average number of failing test cases per test file for all test files of the system under test;
   determining if the number of test case failures for the particular test file is greater than a standard deviation threshold from the average number of failing test cases per test file;
   generating an entry in test file information for the particular test file indicating a number of standard deviations from the average number of failing test cases per test file when the number of test case failures for the particular test file is greater than the standard deviation threshold;
   determining a failure category for at least one identified failure based on the test data from the plurality of data sources;
   assigning a first error reputation to the system under test based on the test data;
   assigning a second error reputation for each test file based on the test data; and
   generating at least one report indicating the failure category for the at least one identified failure.

6. The method of claim 5, further comprising weighting the number of test case failures for the particular test file to determine a weighted number of test case failures.

7. The method of claim 6, wherein the weighting the number of test case failures for the particular test file comprises at least one of:
   reducing the number of test case failures for the particular test file to a constant number of test case failures when one or more test case failures are found when the test is running for a first time;
   reducing the number of test case failures for the particular test file to a second constant number of test case failures when one or more test case failures are found when the test is not running for the first time and no new test case failures are identified; and
   multiplying the number of test case failures for the particular test file by a new-fail-on-old-test factor for any new test case failures when the test is not running for the first time.

8. The method of claim 6, wherein the weighting the number of test case failures for the particular test file comprises at least one of:
   dividing the number of test case failures for the particular test file by an old code factor when a code under test is old;
   dividing the number of test case failures for the particular test file by a warning factor when a test case driver program warning is detected; and
   dividing the number of test case failures for the particular test file by the number of standard deviations from the average number of failing test cases per test file when the particular test file exceeds the standard deviation threshold.

9. The method of claim 6, further comprising at least one of:
   dividing the weighted number of test case failures by a hierarchy factor for each level the particular test file is down in a test hierarchy to determine a final weighted number of test case failures; and
   dividing a number of test case passes by the hierarchy factor for each level the particular test file is down in the test hierarchy to determine a final weighted number of test case passes.

10. The method of claim 9, further comprising determining a weighted pass percentage for the system under test by dividing the final weighted number of test case passes by a sum of the final weighted number of test case passes and the final weighted number of test case failures.

11. The method of claim 10, wherein the assigning the first error reputation to the system under test comprises:
   assigning a high first error reputation if at least one of:
      the weighted pass percentage for the system under test is less than a pass percentage threshold;
      the system under test suffered a failure resulting in system outage;
      two-thirds of an average number of test cases have not completed; and
      a critical test file or bucket failed; and
   otherwise assigning a low first error reputation.

12. The method of claim 1, wherein the assigning the second error reputation for each test file further comprises:
   assigning a high second error reputation for each test file which at least one of:
      contains any new test case failures;
      contains keyword failures; and
      includes a test fail/pass ratio which exceeds a fail/pass standard deviation threshold in comparison to a historical average fail/pass ratio for the test file; and
   otherwise assigning a low second error reputation for each test file.

13. The method of claim 1, wherein the system under test is a hypervisor or a multi-threaded environment.

14. The method of claim 1, wherein a service provider at least one of creates, maintains, deploys and supports a computer infrastructure that performs the steps of claim 1.

15. A software quality evaluation system for evaluating software quality, the software quality evaluation system comprising:
   a processor and a computer readable memory;
   first program instructions to receive test data for a system under test from a plurality of data sources;
   second program instructions to determine a failure category for at least one identified failure based on the test data from the plurality of data sources;
   third program instructions to assign a first error reputation to the system under test based on the test data;
   fourth program instructions to assign a second error reputation for each test file based on the test data; and
   fifth program instructions to generate at least one report indicating the failure category for the at least one identified failure,
   wherein the first, second, third, fourth, and fifth program instructions are stored on the tangible computer readable memory for execution by the processor;
   the first error reputation is one of high and low; and
   the second error reputation is one of high and low.

16. A software quality evaluation system for evaluating software quality, the software quality evaluation system comprising:
   a processor and a computer readable memory;
   first program instructions to receive test data for a system under test from a plurality of data sources;
   second program instructions to determine a failure category for at least one identified failure based on the test data from the plurality of data sources;
   third program instructions to assign a first error reputation to the system under test based on the test data;
   fourth program instructions to assign a second error reputation for each test file based on the test data;
   fifth program instructions to generate at least one report indicating the failure category for the at least one identified failure;
   sixth program instructions to extract a number of test case failures for a particular test file;
   seventh program instructions to determine an average number of failing test cases per test file for all test files of the system under test;
   eighth program instructions to determine if the number of test case failures for the particular test file is greater than a standard deviation threshold from the average number of failing test cases per test file; and
   ninth program instructions to generate an entry for the particular test file indicating a number of standard deviations from the average number of failing test cases per test file if the number of test case failures for the particular test file is greater than the standard deviation threshold,
   wherein the first through fifth program instructions are stored on the tangible computer readable memory for execution by the processor.

17. The software quality evaluation system of claim 16, further comprising:
   tenth program instructions to weight the number of test case failures for the particular test file including at least one of:
      reducing the number of test case failures for the particular test file to a constant number of test case failure when one or more test case failures are found when the test is running for a first time;
      reducing the number of test case failures for the particular test file to a second constant number of test case failures when one or more test case failures are found when the test is not running for the first time and no new test case failures are identified;
      multiplying the number of test case failures for the particular test file by a new-fail-on-old-test factor for any new test case failures when the test is not running for the first time;
      dividing the number of test case failures for the particular test file by an old code factor when a code under test is old;
      dividing the number of test case failures for the particular test file by a warning factor when a test case driver program warning is detected; and
      dividing the number of test case failures for the particular test file by the number of standard deviations from the average number of failing test cases per test file when the particular test file exceeds the standard deviation threshold.

18. The software quality evaluation system of claim 15, wherein the third program instructions to assign the first error reputation to the system under test comprises:

eleventh program instructions to assign a high first error reputation if at least one of:
  a weighted pass percentage for the system under test is less than a pass percentage threshold;
  the system under test suffered a failure resulting in system outage;
  two-thirds of an average number of test cases have not completed; and
  a critical test file or bucket failed; and
twelfth program instructions to otherwise assign a low first error reputation.

19. The software quality evaluation system of claim 15, wherein the fourth program instructions to assign the second error reputation for each test file comprises:
  thirteenth program instructions to assign a high second error reputation for each test file which at least one of:
    contains any new test case failures;
    contains keyword failures; and
    includes a test fail/pass ratio which exceeds a fail/pass standard deviation threshold in comparison to a historical average fail/pass ratio for the test file; and
  fourteenth program instructions to otherwise assign a low second error reputation for each test file.

20. A computer program product comprising a computer usable memory having readable program code embodied in the memory, the computer program product includes at least one component operable to:
  receive test data for a system under test from a plurality of data sources;
  determine a failure category for at least one identified failure based on the test data from the plurality of data sources, wherein the failure category is at least one of:
    a systemic error;
    a local error;
    a tester-caused error; and
    a conflict error; and
  assign a first error reputation to the system under test;
  assign a second error reputation for each test file; and
  generate at least one report indicating the failure category for the at least one identified failure,
  wherein the first error reputation is one of high and low; and
  the second error reputation is one of high and low.

21. The method of claim 1, wherein:
  the failure category is determined from a plurality of failure categories comprising: a systemic failure, a local failure, a tester-caused error, and a conflict error;
  the first error reputation is either a high systemic error reputation or a low systemic error reputation; and
  the second error reputation is either a high local error reputation or a low local error reputation.

22. The method of claim 21, wherein:
  the systemic failure is where an entire system under test is slowed or stopped;
  the local failure is where one test case, thread, or virtual machine fails;
  the tester-caused error is where the at least one identified failure does not reflect a defect, but instead a tester's inexperience;
  the conflict error is where a test case fails because of resource conflicts with other tests running on the system under test;
  a high systemic error reputation indicates a high likelihood of failure of the system under test;
  a low systemic error reputation indicates a low likelihood of failure of the system under test;
  a high local error reputation indicates a problem in code of the system under test; and
  a low local error reputation indicates no problem in code of the system under test.

* * * * *